(12) United States Patent
Watanabe

(10) Patent No.: US 11,388,332 B2
(45) Date of Patent: Jul. 12, 2022

(54) IMAGE CAPTURING APPARATUS, IMAGE CAPTURING METHOD, AND RECORDING MEDIUM

(71) Applicant: Takeshi Watanabe, Kanagawa (JP)

(72) Inventor: Takeshi Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/291,281

(22) PCT Filed: Dec. 27, 2019

(86) PCT No.: PCT/JP2019/051579
§ 371 (c)(1),
(2) Date: May 5, 2021

(87) PCT Pub. No.: WO2020/145212
PCT Pub. Date: Jul. 16, 2020

(65) Prior Publication Data
US 2022/0006949 A1 Jan. 6, 2022

(30) Foreign Application Priority Data

Jan. 11, 2019 (JP) .............................. JP2019-003576
Dec. 23, 2019 (JP) .............................. JP2019-231788

(51) Int. Cl.
*H04N 5/232* (2006.01)
*H04N 5/247* (2006.01)
*H04N 5/265* (2006.01)

(52) U.S. Cl.
CPC ..... *H04N 5/23219* (2013.01); *H04N 5/23238* (2013.01); *H04N 5/247* (2013.01); *H04N 5/265* (2013.01)

(58) Field of Classification Search
None
See application file for complete search history.

(56) References Cited

U.S. PATENT DOCUMENTS

| 2004/0145988 A1 | 7/2004 | Watanabe |
| 2004/0240356 A1 | 12/2004 | Noda et al. |
| 2005/0058041 A1 | 3/2005 | Watanabe |

(Continued)

FOREIGN PATENT DOCUMENTS

| JP | 2014-057156 | 3/2014 |
| JP | 2016-167739 | 9/2016 |

(Continued)

OTHER PUBLICATIONS

International Search Report dated Mar. 10, 2020 in PCT/JP2019/051579 filed on Dec. 27, 2019.

*Primary Examiner* — Eileen M Adams
(74) *Attorney, Agent, or Firm* — Xsensus LLP

(57) ABSTRACT

An image capturing apparatus includes a plurality of imaging devices each of which including an optical system and an image sensor; and a processor. The processor is configured to control the plurality of imaging devices to capture images at a different timing; and combine the images captured by the plurality of imaging devices to generate a combined image. The images to be combined are images captured by the plurality of imaging devices at different timings.

11 Claims, 21 Drawing Sheets

(56) References Cited

U.S. PATENT DOCUMENTS

| | | | |
|---|---|---|---|
| 2015/0189142 A1* | 7/2015 | Kang | H04N 9/8042 |
| | | | 348/135 |
| 2015/0222816 A1 | 8/2015 | Shohara et al. | |
| 2016/0269632 A1 | 9/2016 | Morioka | |
| 2017/0150050 A1* | 5/2017 | Umeo | H04N 5/77 |
| 2018/0007283 A1* | 1/2018 | El Choubassi | G11B 27/005 |
| 2018/0063397 A1 | 3/2018 | Sudou et al. | |
| 2018/0205889 A1* | 7/2018 | Abbas | H04N 7/181 |
| 2019/0364206 A1* | 11/2019 | Dal Mutto | G06T 7/85 |
| 2021/0042350 A1* | 2/2021 | Zhang | G06F 16/90348 |

FOREIGN PATENT DOCUMENTS

| | | |
|---|---|---|
| WO | WO2016/136838 A1 | 9/2016 |
| WO | WO2018/025825 A1 | 2/2018 |
| WO | WO2020/022132 A1 | 1/2020 |

\* cited by examiner

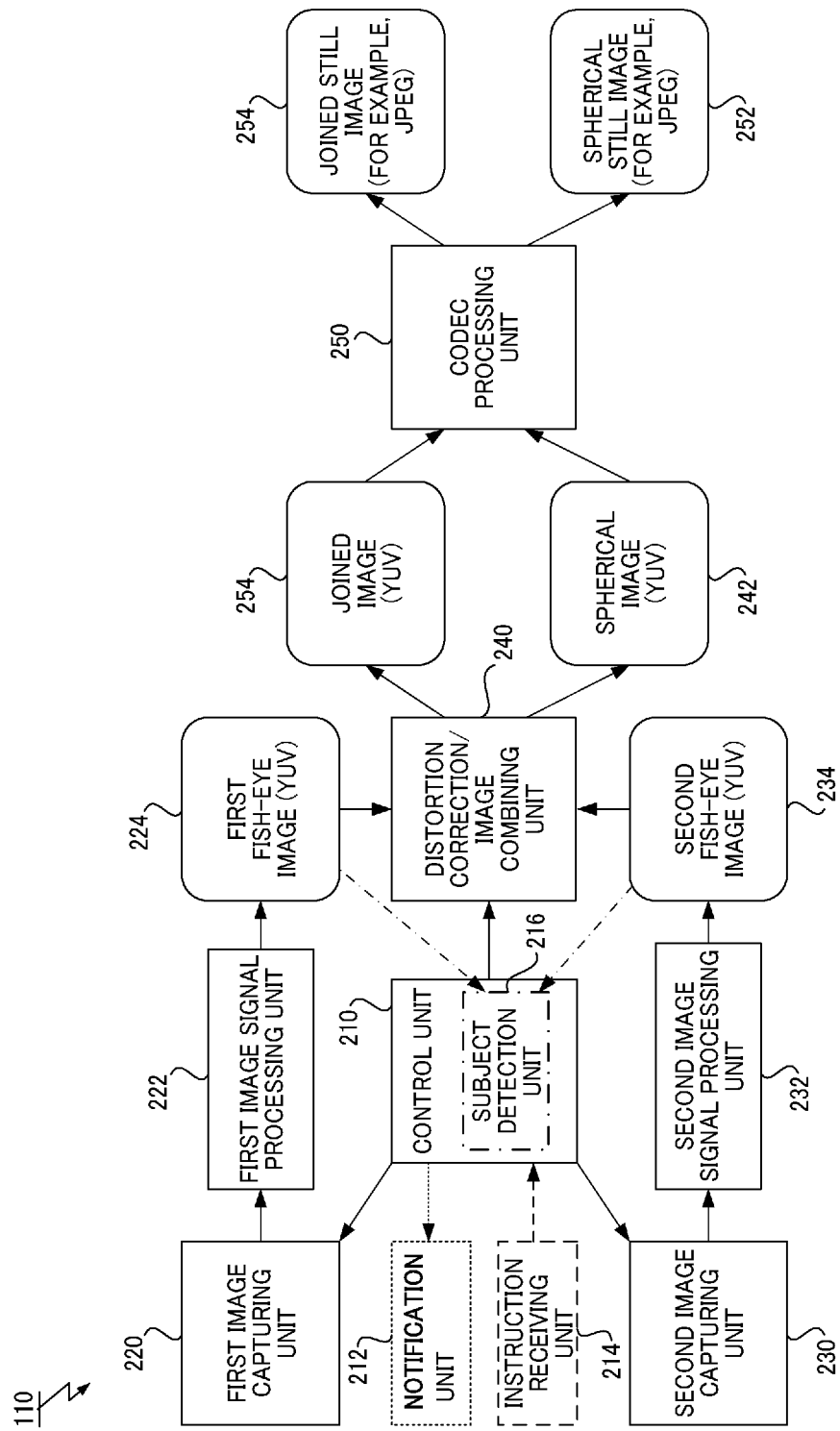

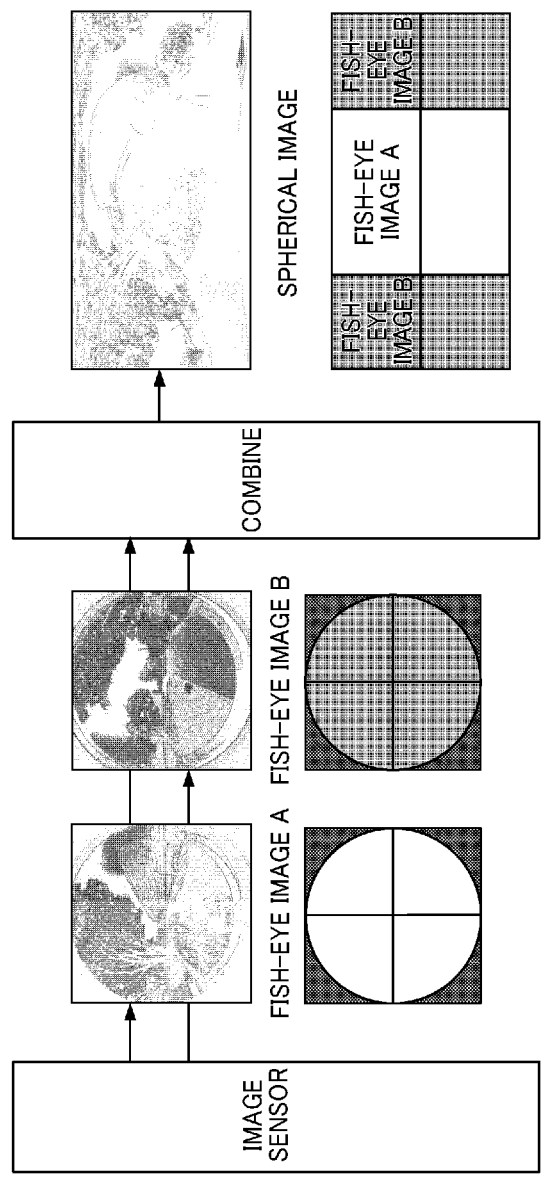

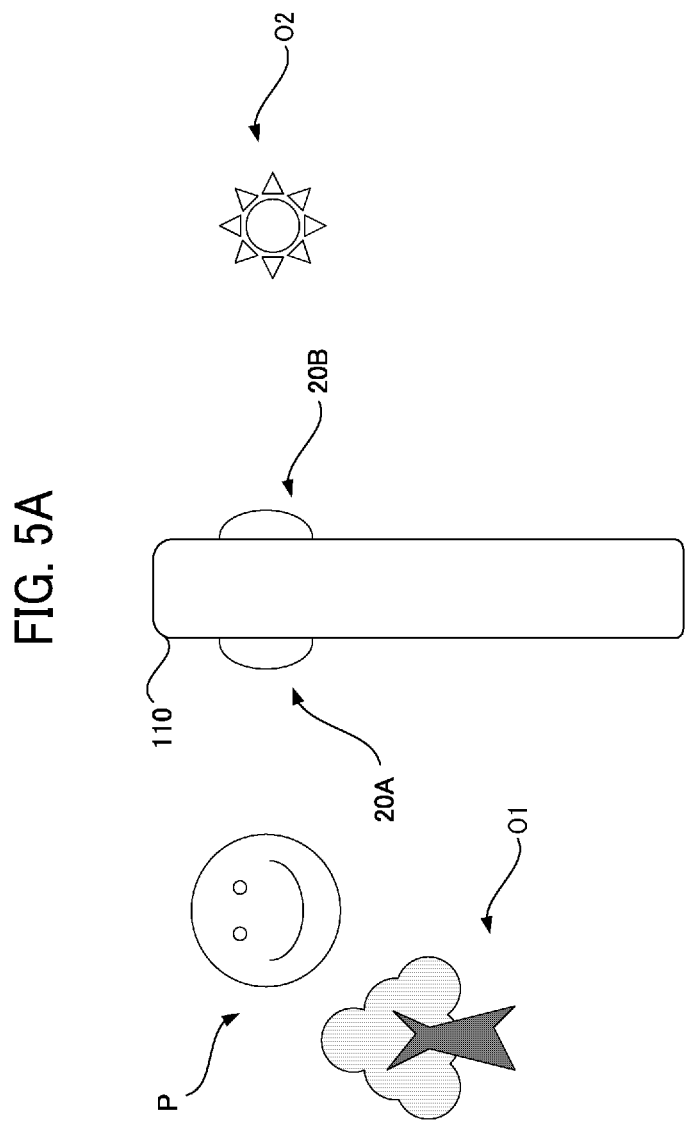

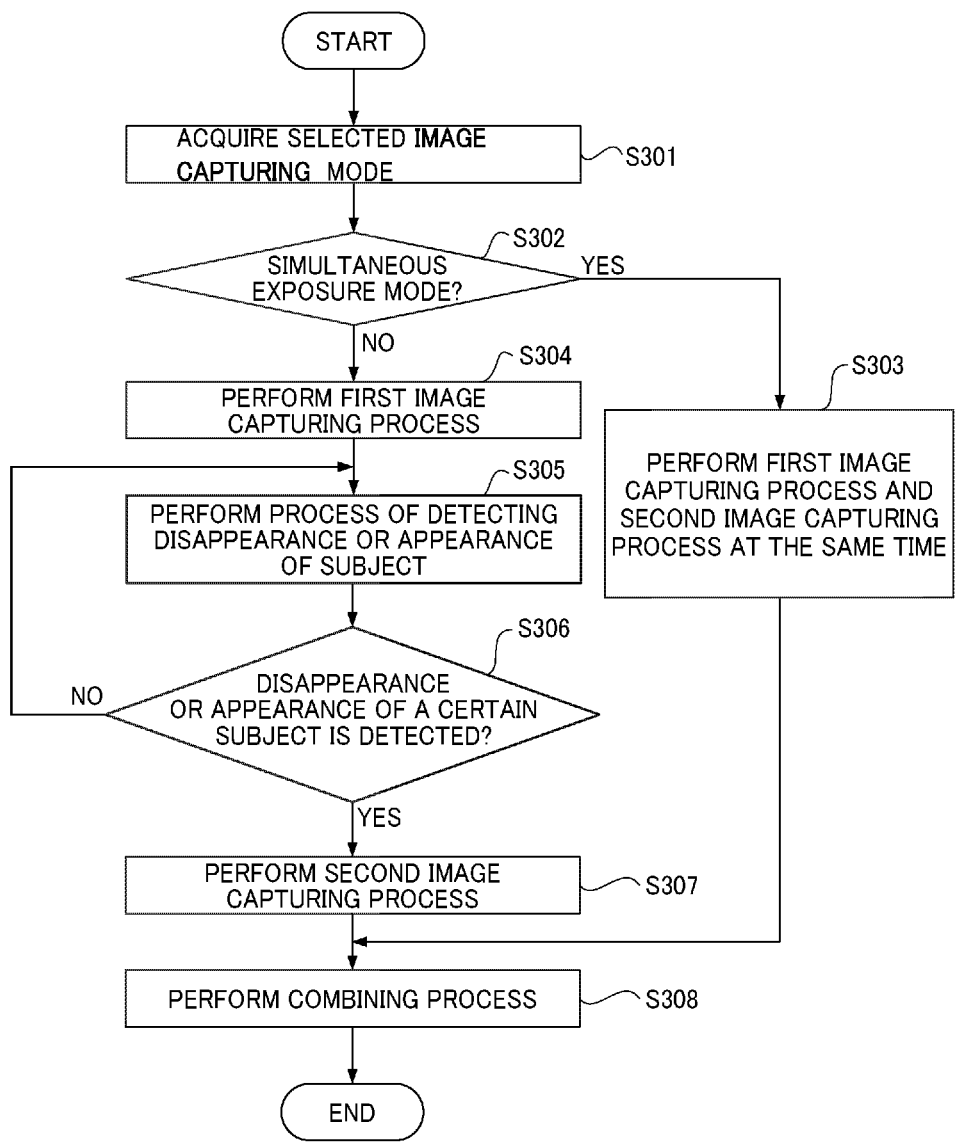

FIG. 10B
FISH-EYE IMAGE A
(AFTER FIRST POINT IN TIME)
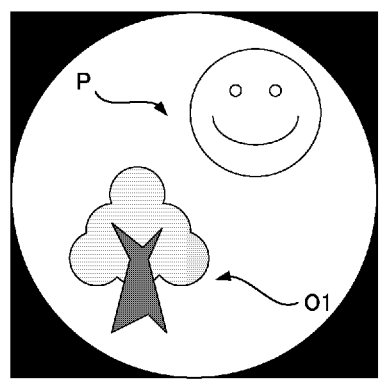
FISH-EYE IMAGE B
(AFTER FIRST POINT IN TIME)
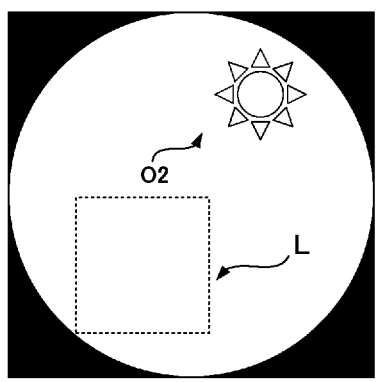

FIG. 11C
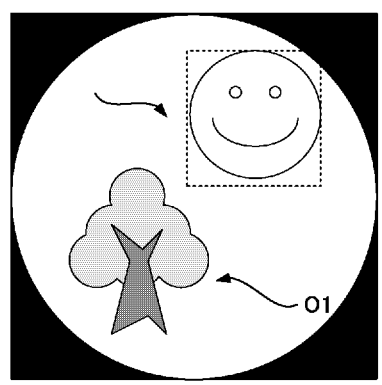
FISH-EYE IMAGE A
(SECOND POINT IN TIME)
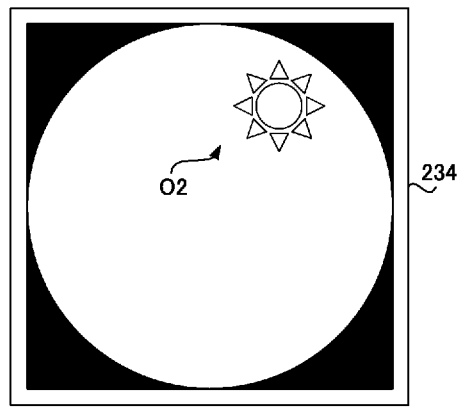
FISH-EYE IMAGE B
(SECOND POINT IN TIME)

IMAGE CAPTURING APPARATUS, IMAGE CAPTURING METHOD, AND RECORDING MEDIUM

CROSS-REFERENCE TO RELATED APPLICATIONS

The present application is based on PCT filing PCT/JP2019/051579, filed Dec. 27, 2019, which claims priority to JP 2019-003576, filed Jan. 11, 2019, and JP 2019-231788, filed Dec. 23, 2019, the entire contents of each are incorporated herein by reference.

TECHNICAL FIELD

The embodiments of the present disclosure relate to an image capturing apparatus, image capturing method, and a recording medium.

BACKGROUND ART

An image capturing apparatus is known that includes a plurality of imaging devices each including a lens optical system and an image sensor. Such an image capturing apparatus simultaneously captures images using the plurality of imaging devices and combines the captured images to generate one set of images. As an example of such an image capturing apparatus, a spherical-image capturing apparatus that captures a 360-degree omnidirectional image by a one-time instruction for capturing an image is known.

As the image capturing apparatus captures an image of a wide field of view at one time, a certain subject, such as a photographer himself/herself, might be reflected in the image-capturing range. This is suitable when it is desired to capture an image of the surrounding atmosphere including the photographer himself/herself. However, there are cases where the photographer himself/herself is not desired to be a subject, and issues caused by such a situation cannot be handled by the conventional technologies.

For example, JP-6065474-B (JP-2014-57156-A) discloses the technology that combines images using a plurality of imaging devices. The technology of JP6065474-B achieves a reduction in discontinuity that occurs in a joining part of the images captured by the plurality of imaging optical systems. JP-6065474-B also discloses an image-capturing control apparatus capable of providing the condition for capturing an image for each imaging optical system; an image-capturing controlling method performed by the image-capturing control apparatus; and a program for performing the method. However, the technology of JP-6065474-B fails to handle the issue that a subject such as a photographer is reflected in a captured image.

CITATION LIST

Patent Literature

[PTL 1] JP-6065474-B

SUMMARY OF INVENTION

Technical Problem

The present disclosure is made in light of the above-described situation, and an object of the disclosure is to provide an image-capturing apparatus capable of preventing a certain subject from being reflected in images captured by a plurality of imaging devices.

Solution to Problem

In view of the above, there is provided an image capturing apparatus including a plurality of imaging devices each of which including an optical system and an image sensor; and a processor. The processor is configured to control the plurality of imaging devices to capture images; and combine the images captured by the plurality of imaging devices to generate a combined image. The images to be combined are images captured by the plurality of imaging devices at different timings.

Advantageous Effects of Invention

The embodiments of the present disclosure provide an image-capturing apparatus capable of preventing a certain subject from being reflected in images captured by a plurality of imaging devices.

BRIEF DESCRIPTION OF DRAWINGS

The accompanying drawings are intended to depict example embodiments of the present disclosure and should not be interpreted to limit the scope thereof. The accompanying drawings are not to be considered as drawn to scale unless explicitly noted. Also, identical or similar reference numerals designate identical or similar components throughout the several views.

FIG. 3 is a block diagram of functions implemented by the spherical-image capturing apparatus according to an embodiment.

FIG. 4A is a data flow diagram for describing generation of a spherical image.

FIG. 5A is an illustration of the relative positions of the spherical-image capturing apparatus according to an embodiment and subjects including a photographer.

FIG. 9 is a flowchart of a process of capturing a spherical image performed by the spherical-image capturing apparatus according to still another embodiment.

FIGS. 11A, 11B, and 11C (FIG. 11) are illustrations of fish-eye images captured at different points in time by the spherical-image capturing apparatus according to an embodiment in which appearance of a certain subject is detected.

DESCRIPTION OF EMBODIMENTS

Figure 1:
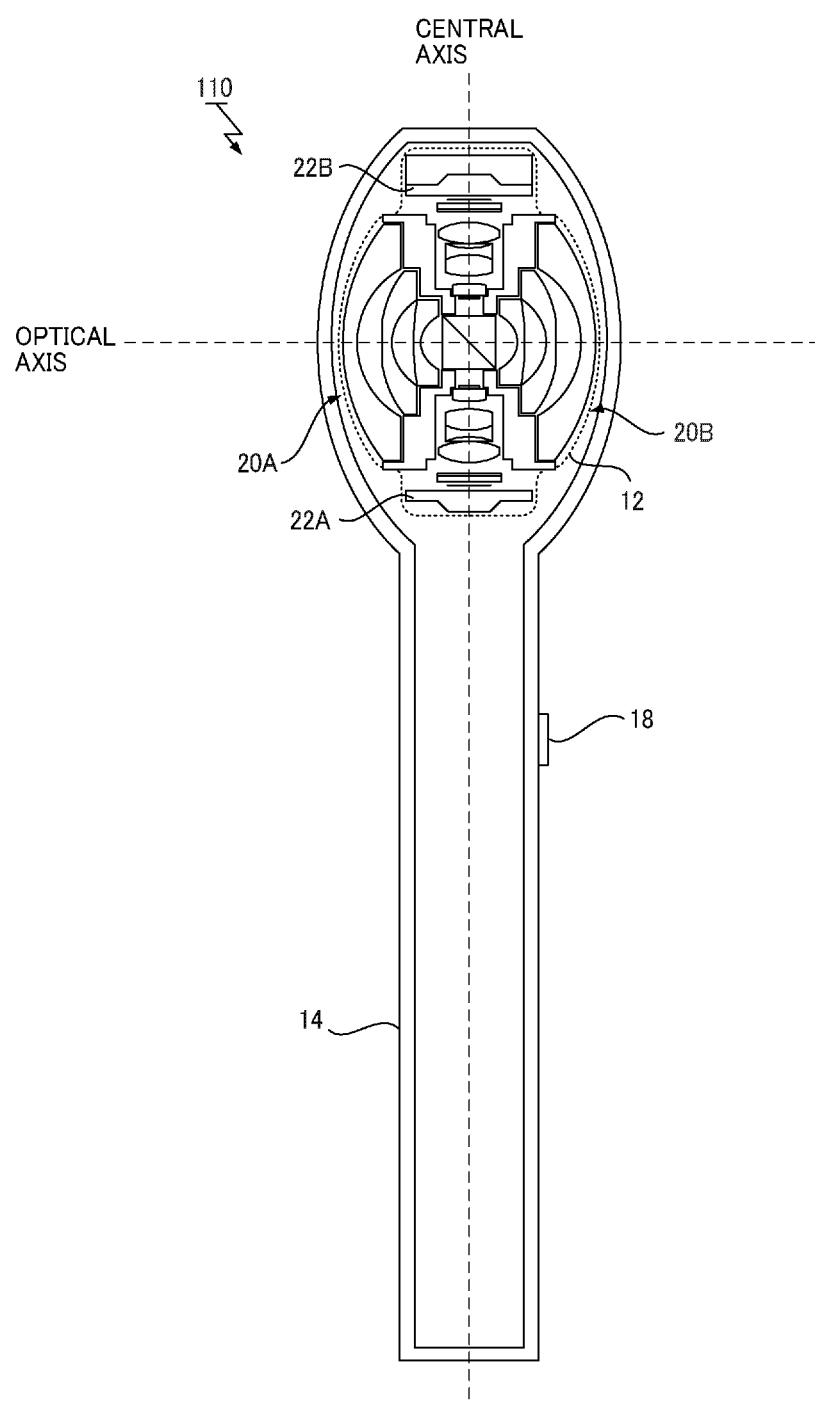
FIG. 1 is a cross-sectional view of a spherical-image capturing apparatus according to an embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described in detail referring to the drawings. Like reference signs are applied to identical or corresponding components throughout the drawings and redundant description thereof may be omitted.

Hereinafter, the configuration of the spherical-image capturing apparatus 110 according to an embodiment is described with reference to FIGS. 1 and 2.

FIG. 1 is a cross-sectional view of the spherical-image capturing apparatus 110 according to an embodiment. The spherical-image capturing apparatus 110 in FIG. 1 includes an imaging body 12, a casing 14, and a shutter button 18. The casing holds a component, such as the imaging body 12, a circuit board, and a battery.

The imaging body 12 in FIG. 1 includes two lens barrel units each including an image-forming optical system 20 and an image sensor 22. The image sensor 22 is, for example, a charge coupled device (CCD) or a complementary metal oxide semiconductor (CMOS), and is controlled by a control command from the CPU. Each image-forming optical systems 20 is configured as a fish-eye lens consisting of, for example, seven lenses in six groups. In the embodiment illustrated in FIG. 1, the above-mentioned fish-eye lens has a full angle of view of greater than 180 degrees (=360 degrees/n, where n denotes the number of optical systems and n is 2). Preferably, the fish-eye lens in FIG. 1 has an angle of view of 185 degrees or greater, and more preferably of 190 degrees or greater. Such a wide-angle combination of one of the image forming optical systems 20 and one of the image sensors 22 constitutes an image capturing section in the present embodiments. In the embodiments to be described, the case where two optical systems (image capturing units) are incorporated in the spherical-image capturing apparatus 110 is described. However, this is only one example, and three or more optical systems (image capturing units) may be incorporated in the spherical-image capturing apparatus 110.

The relative positions of the optical elements (lenses, prisms, filters, and aperture stops) of the two image-forming optical systems 20A and 20B are defined with reference to the image sensors 22A and 22B. More specifically, these elements are positioned such that the optical axis of the optical element of each of the image-forming optical systems 20A and 20B meets the central portion of the light receiving area of corresponding one of the image sensors 22 at the right angle and such that the light receiving area serves as the image-forming plane of corresponding one of the fish-eye lenses.

In the embodiment illustrated in FIG. 1, the image-forming optical systems 20A and 20B have the same specification, and are combined facing the opposite directions such that the optical axes thereof match with each other. The image sensors 22A and 22B transform the light distribution of the received light into image signals, and sequentially output image frames to an image processing block of the control board. As will be described later in detail, the images captured by the respective image sensors 22A and 22B are combined to generate an image over a solid angle of $4a$ steradian (hereinafter, such an image is referred to as a "spherical image"). The spherical image is an image of all the directions that can be seen from an image capturing point. In the following embodiments, cases where a spherical still image is generated are described. Alternatively, a full-circle still image or a panoramic still image may be generated. Note that such a panoramic image is obtained by photographing 360 degrees only in a horizontal plane. In the following, a still image may be collectively referred to as an image.

Figure 2:
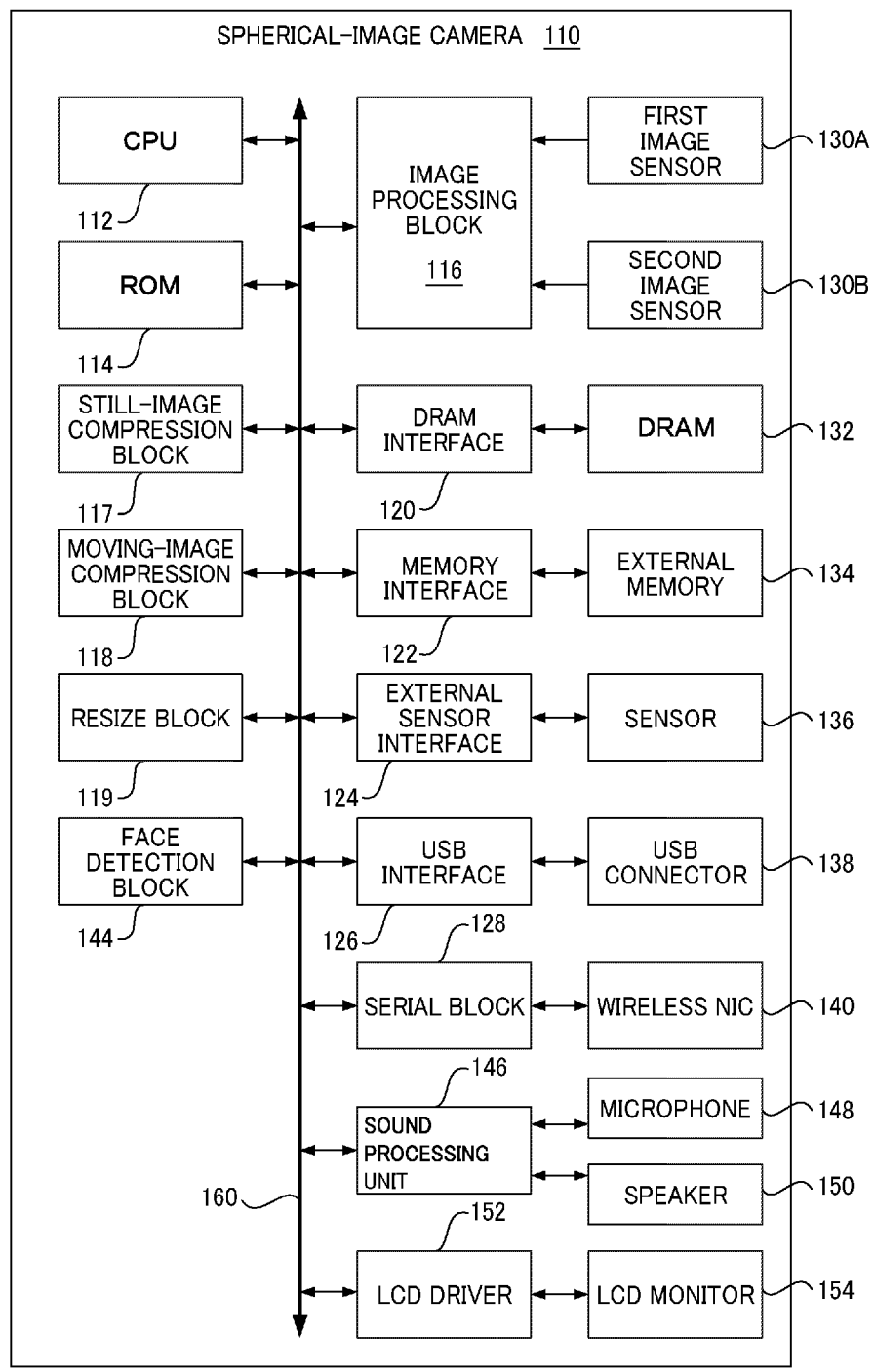
FIG. 2 is a block diagram of a hardware configuration of the spherical-image capturing apparatus according to an embodiment.

FIG. 2 is a block diagram of a hardware configuration of the spherical-image capturing apparatus 110 according to an embodiment. The spherical-image capturing apparatus 110 corresponds to an image capturing apparatus according to the embodiments to be described in this disclosure.

The spherical-image capturing apparatus 110 includes a central processing unit (CPU) 112 (a processor), a read only memory (ROM) 114, an image processing block 116, a still-image compression block 117, a moving-image compression block 118, a resize block 119, a dynamic random access memory (DRAM) 132 connected thereto via a DRAM interface 120, and a sensor 136 connected thereto via a sensor interface 124.

The CPU 112 controls the entire operations of the spherical-image capturing apparatus 110. The ROM 114 stores therein a control program described in a code readable by the CPU 112 and various kinds of parameters. By using rewritable flash ROM 114, the control program and the parameter for control can be changed, and a version of the function can be easily updated.

In addition to the ROM 114, any desired memory such as an SSD for storing the control program may be provided together with the ROM 114. The image processing block 116 is connected to a first image sensor 130A and a second image sensor 130B (corresponding to the image sensors 22A and 22B in FIG. 1, respectively), and receives image signals of images captured by the image sensors 130A and 130B. The image processing block 116 includes, for example, an image signal processor (ISP), and applies, for example, shading correction, Bayer interpolation, white balance correction, and gamma correction to the image signals received from the image sensors 130A and 130B.

The still-image compression block 117 is a codec block that compresses and expands a still image such as joint photographic experts group (JPEG). The moving-image compressing block 118 is a codec block for compressing and expanding a video such as that in moving picture experts group (MPEG)-4 advanced video coding (AVC)/H.264 format. In the present embodiments, JPEG and H.264 are described as examples of codecs for still images and moving images, respectively, but no limitation is intended thereby. Since there are various other variations of codecs, other codecs may be used, or a plurality of codecs may be installed. The resize block 119 is a block that enlarges or reduces the size of image data by interpolation processing.

The DRAM 132 provides a storage area for temporarily storing data therein when various types of signal processing and image processing are applied. Examples of the image data to be stored include RAW-RGB image data whose white balance and gamma have been set through the signal processing, YUV image data whose luminance data and color difference data have been converted through the signal processing, and JPEG image data on which, for example, JPEG compression has been performed by the still-image compression block 117.

The sensor 136 is, for example, a sensor for detecting three-axis acceleration components and three-axis angular velocity components. The detected acceleration component and angular velocity component are used to perform one or both of zenith correction of the spherical image in the direction of gravity (reference direction) and rotation correction around the direction of gravity as described later. The sensor 136 may further include other sensors such as a geomagnetic sensor for obtaining an azimuth angle. In the present embodiment, the sensor 136 is a three-axis sensor. However, this is only one example. Alternatively, the sensor 136 may be a six-axis acceleration sensor or a six-axis angular sensor.

The spherical-image capturing apparatus 110 further includes an external memory interface 122, a universal serial bus (USB) interface 126, and a serial block 128. The external memory interface 122 is connected to an external memory 134. The external memory interface 122 controls reading and writing of data from and to an external memory 134, such as a memory card inserted in a memory card slot. The USB interface 126 is connected to a USB connector 138. The USB interface 126 controls USB-based communication with an external device such as a smartphone via the USB connector 138. The serial block 128 controls serial communication with an external device such as a smartphone and is connected to a wireless network interface card (NIC) 140.

The spherical-image capturing apparatus 110 in FIG. 2 further includes a face detection block 144. The face detection block 144 performs face detection using, for example, a fish-eye image or an image subjected to zenith correction, and identifies the position of a human face. The face detection block 144 is used to detect the disappearance or appearance of a certain subject such as a photographer.

The spherical-image capturing apparatus 110 in FIG. 2 further includes a sound processing unit 146. The sound processing unit 146 is connected to a microphone 148 that inputs an audio signal and a speaker 150 that outputs the audio signal.

The sound processing unit 146 typically has a microphone amplifier that amplifies an audio signal input via the microphone 148, an audio recording circuit that records the amplified audio signal, and a sound reproduction circuit that converts the recorded audio signal into a signal that can be output from the speaker 150, and an audio amplifier that drives the speaker 150. The sound processing unit 146 operates under the control of the CPU 112.

The spherical-image capturing apparatus 110 in FIG. 2 further includes a liquid crystal display (LCD) driver 152 to which a LCD monitor 154 is connected. The LCD driver 152 is a driver circuit that drives the LCD monitor 154 and performs conversion to a signal used to display various states on the LCD monitor 154. Instead of the LCD monitor 154, an organic light emitting diode (OLED) display may be mounted on the spherical-image capturing apparatus 110.

The above-described components 112 to 128, 144, 146, and 152 are connected to each other via a bus 160. When the power is turned on by the operation of a power switch provided on the casing 14, the control program stored in the ROM 114 is loaded into a main memory such as a static random access memory (SRAM) and/or the DRAM 132, operating as a work area for the CPU 112. The CPU 112 executes the program read into the main memory to control the operations of the device, and temporarily stores the data required for the control in the main memory. Through this operation, the CPU 112 controls the spherical-image capturing apparatus 110 to implement various types of function or perform various types of operation as will be described later. The control program may include, for example, firmware, an operating system (OS), and a plug-in application.

Hereinafter, the functions of the spherical-image capturing apparatus 110 according to at least one embodiment is described with reference to FIGS. 3 to 7.

FIG. 3 is a block diagram of functions implemented by the spherical-image capturing apparatus 110 according to an embodiment. As illustrated in FIG. 3, the functional block of the spherical-image capturing apparatus 110 includes a control unit 210, a plurality of image capturing units, a plurality of image signal processing units, and a distortion correction/image combining unit 240. The spherical-image capturing apparatus 110 according to the embodiment illustrated in FIG. 3 includes two optical systems (image capturing units), a first image capturing unit 220, a second image capturing unit 230, a first image signal processing unit 222, and a second image signal processing unit 232, as described with reference to FIG. 1. In cases where three or more optical systems (image capturing units) are included in the spherical-image capturing apparatus 110, the number of image capturing units and image signal processing units may be set according to the number of optical systems.

The control unit 210 includes, for example, the CPU 112 in FIG. 2. The control unit 210 controls the image capturing units 220 and 230 and thus controls the entire operation of the spherical-image capturing apparatus 110.

Each of the first image capturing unit 220 and the second image capturing unit 230 is implemented by the image-forming optical system 20 and the image sensor 22 (130) in FIGS. 1 and 2. The image sensor 22 (130) of the image capturing units 220 and 230 is controlled by a control command from the control unit 210 of the CPU 112. The image sensors 22A and 22B (130A and 130B) of the image capturing units 220 and 230 simultaneously start exposure and obtain data in the regular spherical-image capturing process (simultaneous exposure mode) under the control of the control unit 210 (the CPU112).

The first image signal processing unit 222 and the second image signal processing unit 232 set white balance and gamma (performs white balance setting and gamma setting) for the image data transmitted from the first image capturing unit 220 and the second image capturing unit 230, respectively. The first image signal processing unit 222 and the second image signal processing unit 232 further convert the image data into luminance data and color difference data through filtering processing, and output fish-eye images 224 and 234 in the form of YUV format. The data of the fish-eye images 224 and 234 in the form of YUV format may be written to the DRAM 132 or may be output to the external memory 134 via the external memory interface 122.

The distortion correction/image combining unit 240 combines the fish-eye images 224 and 234 obtained from the plurality of image capturing units 220 and 230. More specifically, the distortion correction/image combining unit 240 performs a distortion correction process and an image combining process on the fish-eye images 224 and 234.

Figure 4B:
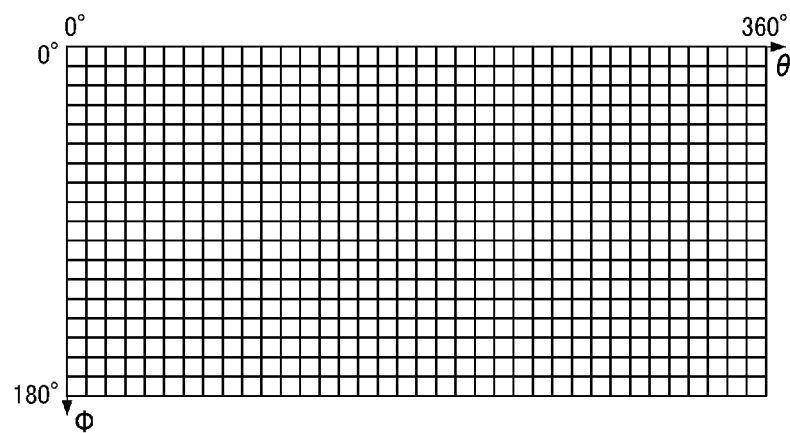
FIG. 4B is an illustration of a planar data structure of a spherical image.

Hereinafter, a process of generating a spherical image and a generated spherical image are described with reference to FIGS. 4A, 4B, and 4C. FIG. 4A is an illustration of the data structure of each image and the data flow of the image in the process of generating a spherical image. First, an image directly captured by each of the image sensors 130A and 130B is an image that roughly convers a hemisphere of the whole sphere as a field of view. Light that passes through the image-forming optical system 20 is focused on the light receiving area of the image sensor 130 to form an image according to a predetermined projection system. The image sensor 130 is a two-dimensional image sensor whose light-receiving area defines a planar area. Accordingly, the image formed by the image sensor 130 is image data represented by the plane coordinate system. A formed image is configured as a typical fish-eye image that contains an image circle as a whole in which each captured area is projected, as illustrated in a fish-eye image A and a fish-eye image B in FIG. 4A. The following embodiment is described with a fish-eye image captured using a fish-eye lens. However, such a fish-eye image includes a wide-angle image captured using a wide-angle lens other than the fish-eye lens.

The plurality of fish-eye images captured by the plurality of image sensors 130 are subjected to the distortion correction process and the image combining process so as to generate one spherical image. In the image combining process, two spherical images each including a complementary hemispherical portion are generated from the fish-eye images each configured as a planar image. Then, the two spherical images including the respective hemispherical portions are joined together by matching the overlapping areas of the hemispherical portions, and the spherical images are synthesized to generate a full spherical (omnidirectional) image including the whole sphere.

FIG. 4B is an illustration of a planar data structure of the image data of a spherical image used in the embodiment of the present disclosure.

Figure 4C:
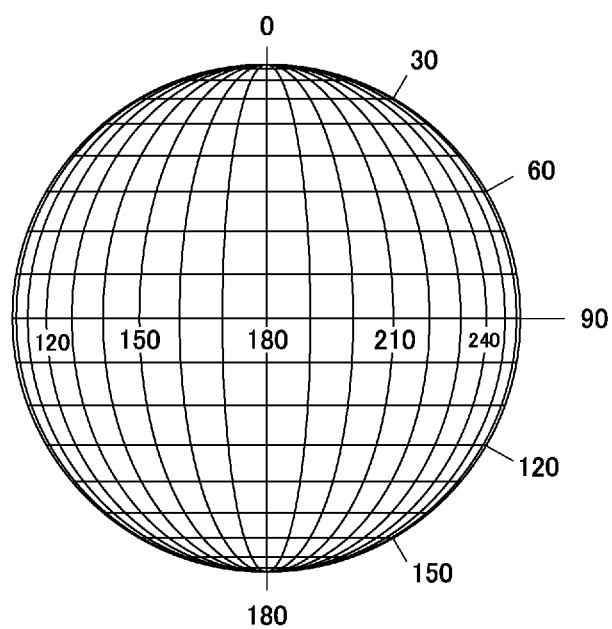
FIG. 4C is an illustration of a spherical data structure of the spherical image.

FIG. 4C is an illustration of a spherical data structure of the image data of the spherical image.

As illustrated in FIG. 4B, the image data of the spherical image is expressed as an array of pixel values in the coordinates defined by the vertical angle φ corresponding to the angle with reference to a referential axis and the horizontal angle θ corresponding to the angle of rotation around the referential axis. The vertical angle φ ranges from 0° to 180° (alternatively from −90° to +90°), and the horizontal angle θ ranges from 0° to 360° (alternatively from −180° to +180°).

As illustrated in FIG. 4C, the respective coordinate values (θ, φ) of the spherical image format (the spherical data structure of the image data) are associated with the points on the sphere that represents all directions from the photographing location. Thus, all directions are associated with the points on the spherical images. The plane coordinates of the fish-eye image captured by a fish-eye lens are associated with the coordinates on the sphere of the spherical image, which are included in a predetermined transformation table. The transformation table includes data prepared in advance by, for example, a manufacturer in accordance with a predetermined projection model based on design data of each lens optical system. The data of the transformation table is used for transforming a fish-eye image into a spherical image in consideration of distortion. In performing the distortion correction process and the image combining process, data may be temporarily stored in the DRAM 132.

Note that, in the distortion correction process and the image combining process, the distortion correction/image combining unit 240 performs the distortion correction and the zenith correction using the information acquired from the sensor 136 so as to generate a combined image on which the zenith correction has been performed. In general, the zenith correction and the distortion correction are irreversible transformation processes, respectively, and are described herein as being performed at the same time. However, the zenith correction and the distortion correction may be performed in separate timings. The zenith correction is a correction process that corrects an image captured with the central axis (see FIG. 1) of the spherical-image capturing apparatus 110 tilted with respect to the reference direction (for example, the direction of gravity) so as to obtain an image whose central axis is aligned with the direction Z of gravity. In a specific embodiment, in addition to the zenith correction, a rotation correction that cancels the angle change around the reference direction may be performed.

With the distortion correction process and the image combining process by the distortion correction/image combining unit 240, the distortion correction/image combining unit 240 outputs a spherical image in the form of YUV format (the equirectangular format) 242. As described above, such a spherical image may be output from the distortion correction/image combining unit 240 to, for example, the DRAM 132 or the external memory 134. The distortion correction/image combining unit 240 constitutes a generation unit that generates a combined image based on a plurality of fish-eye images captured by the plurality of image capturing units 220 and 230 according to the present embodiment.

In the present embodiments, it is assumed that the distortion correction/image combining unit 240 outputs as a combined image a spherical image 242 in the form of the YUV format obtained by the coordinate transformation. However, there is no need to output such a combined image as the combined spherical image as illustrated in FIG. 4A. The combined image may be output in any desired form as long as a spherical image can be constituted at the time of viewing. For example, assuming that a spherical image is generated by performing the distortion correction and combining processes on the fish-eye images at the time of viewing, two pieces of still-image data (the still images that correspond to the fish-eye image A and the fish-eye image B in FIG. 4A) of the fish-eye images directly captured by the image sensors 130A and 130B are joined together side by side, so as to generate one image. A still image of the generated one image (a joined image 244 in the form of the YUV format (in the dual fish-eye format)) may be output. Further, the combined image may not be generated in one file, but may be in separate files associated with two fish-eye images directly captured by the image sensors 130A and 130B. In addition, the combined image is not limited to a spherical image, and may be a panoramic image obtained by photographing 360 degrees in a horizontal plane or may be a partial spherical image or a partial panoramic image.

As illustrated in FIG. 3, the functional block 200 of the spherical-image capturing apparatus 110 may further include a codec processing unit 250. The codec processing unit 250 includes the still-image compression block 117 in FIG. 2. The spherical image 242 in the form of the YUV format or the joined image 244 in the form of the YUV format output from the distortion correction/image combining unit 240 is converted into a predetermined still-image format and output a spherical still image 254 or a joined still image 252 in the predetermined still image format (for example, JPEG) by the codec processing unit 250.

The output destination may be the external memory 134 or may be within a memory of an external information terminal via the USB connector 138 or the wireless network interface card (NIC) 140. Note that a still image may be recorded in any format as long as the still image is reproducible. Examples of still-image format include JPEG, portable network graphics (PNG), and bitmap (BMP).

The above-described spherical-image capturing apparatus 110 combines the image-capturing range of the image capturing unit 220 and the image-capturing range of the image capturing unit 230, so as to capture an omnidirectional image around the shooting location at one time.

Figure 5B:
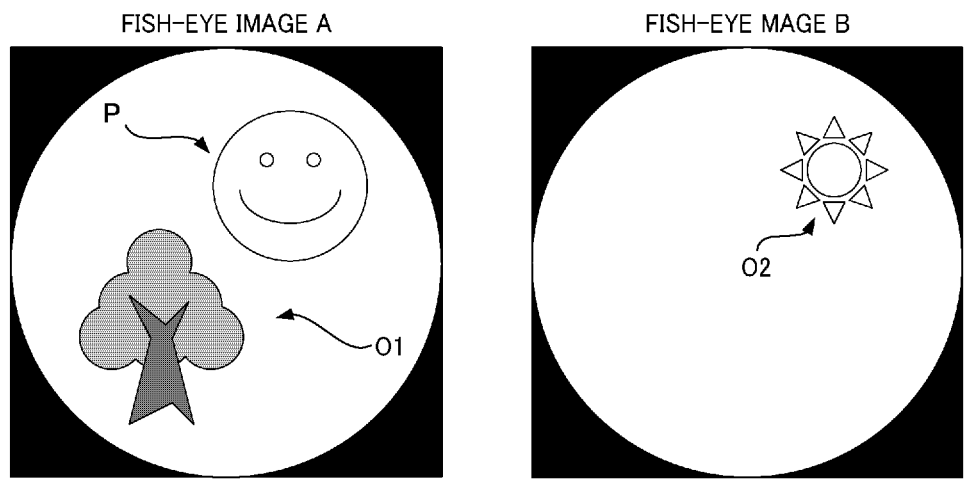
FIG. 5B is an illustration of two captured fish-eye images.
Figure 5C:
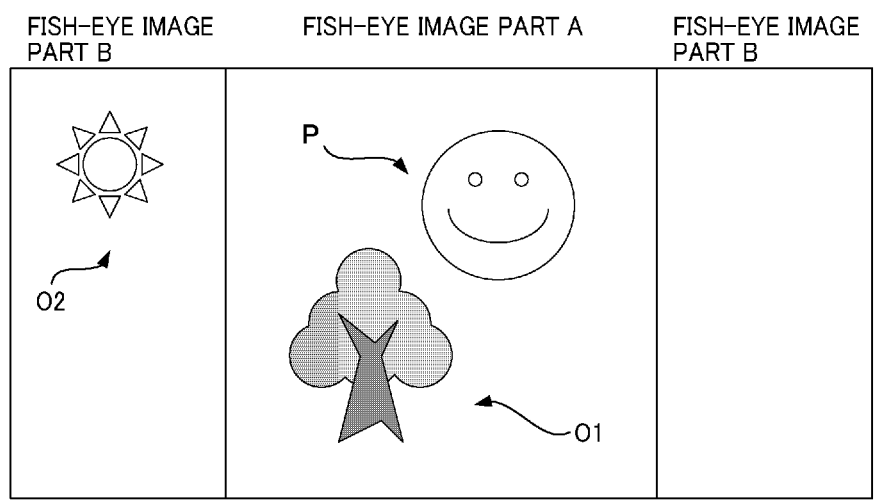
FIG. 5C is an illustration of a combined spherical image.

FIG. 5A is an illustration of the relative positions of the spherical-image capturing apparatus 110 according to the embodiment and a subject including a photographer. FIG. 5B is an illustration of two fish-eye images (a fish-eye image A and a fish-eye image B) captured with the relative positions of the spherical-image capturing apparatus 110 and the subject illustrated in FIG. 5A. FIG. 5C is an illustration of a spherical image obtained by combining the two fish-eye images illustrated in FIG. 5B with the relative positions illustrated in FIG. 5A.

In FIG. 5A, a photographer P, a subject O1, and a subject O2 are arranged around the spherical-image capturing apparatus 110. As illustrated in FIG. 5A, the spherical-image capturing apparatus 110 includes an optical system 20A on the front face and another optical system 20B on the back face. As illustrated in FIG. 5B, the fish-eye images captured through the optical systems 20A and 20B include subjects on the respective sides (the photographer P and the subject O1 in the fish-eye image A and the subject O2 in the fish-eye image B). Further, in the combined spherical image, the entire subject including the photographer P and the subjects O1 and O2 is reflected.

Such a spherical image is suitable when the surrounding atmosphere including the photographer P himself/herself is desired to be shot. However, as a wide field of view in all directions is shot at a time, the photographer P is reflected in the combined image-capturing range. Such a situation is not desired by the photographer P.

In order to avoid such a situation, the spherical-image capturing apparatus 110 according to the embodiments provide, in addition to the above-described simultaneous exposure mode, an image-capturing mode to prevent a certain subject from being reflected in an image captured by using both the image capturing unit 220 and the image capturing unit 230. Such an image-capturing mode is referred to as a staggered exposure mode. In the following embodiments, the cases where a subject to be prevented from being reflected in a captured image (a target) is a photographer is described. This is only one example, and any subject other than a photographer may be a target.

In the staggered exposure mode, the control unit 210 according to the embodiment controls the plurality of image capturing units 220 and 230 to capture images at different times (timings). The control unit 210 also causes the distortion correction/image combining unit 240 to combine the plurality of images captured at different times.

When one fish-eye image is captured, a certain time width occurs in the image-capturing process due to the exposure time, and the time gap between the exposure timing and the reading time for each line in the case of rolling shutter. The expression "different times" at which the image capturing units 220 and 230 capture images refers to the condition that the timings of image-capturing processes (each ranges from the exposure starting to data reading) of the image capturing units 220 and 230 are intentionally staggered so as not to at least overlap each other. The cases where such a time gap occurs due to the accuracy of synchronization do not apply to the "different times". Preferably, the "different times" refers to the condition that the timings of image-capturing processes of the image capturing units 220 and 230 are sufficiently staggered to a degree that a subject is movable from an image-capturing range to the outside of the image-capturing range.

In addition, the expression "simultaneous" of the simultaneous exposure mode may not be defined such that all of the pixels capture images at the same time as in the case of global shutter. The case where there is a time gap between the exposure timing and the reading timing or a time gap due to the accuracy of synchronization may fall within the range of definition of the expression "simultaneous".

By operating the plurality of image capturing units 220 and 230 to capture images at different timings, the photographer P can move to the outside of the image-capturing range of the image-capturing unit that is not to capture an image next or the image-capturing unit that is to capture an image next, after one of the image capturing units 220 and 230 finishes capturing an image.

In a specific embodiment, the control unit 210 measures a period of time that has elapsed from a time when the first image capturing unit 220 captures an image. In response to the measured time (elapsed time) that has reached a specified time, the control unit 210 controls the second image capturing unit 230 to capture an image.

In the present embodiment, the first image capturing unit 220 captures an image before the second image capturing unit 230 starts capturing an image. This order may be reversed. Further, it may be preliminarily determined or may be set by a user which one of the first image capturing unit 220 and the second image capturing unit 230 is to first start capturing an image. Further, the elapsed time from the time when the one of the first image capturing unit 220 and the second image capturing unit 230 captures an image may be an elapsed time that has elapsed from any desired reference point in time related to the image-capturing process. For example, the elapsed time may be an elapsed time that has elapsed from the end of the image-capturing process (which is the reference point in time), or may be from the start of the image-capturing process. Alternatively, the elapsed time may be an elapsed time from the completion of output of images from the image signal processing units 222 and 232 after the end of the image-capturing process. However, no limitation is intended thereby.

As described above, in the staggered exposure mode, based on the elapsed time from the time when one image capturing unit (for example, 220) captures an image, the other image capturing unit (for example, 230) starts capturing an image. Within such a certain time, the photographer P moves out of the image-capturing range of the other image capturing unit (for example, 230) following the image-capturing of the one image capturing unit (for example, 220). With this configuration, the photographer P figures out the elapsed time or the remaining time so as to estimate the timing of the next image capturing process.

In view of this, a specific embodiment effective for such a situation is also illustrated in FIG. 3. In such a specific embodiment, the functional block of the spherical-image capturing apparatus 110 further includes a notification unit 121 indicated by dotted lines. Under the control of the control unit 210, the notification unit 212 provides information regarding the next image capturing process (subsequent to the preceding image capturing process) to be performed based on the elapsed time by, for example, outputting sound or light or by displaying that information on a display device. The operation of providing the information regarding the image capturing process includes notifying, for example, a start of the time measurement, an elapsed time, and the remaining time.

Examples of the notification with sound include outputting of a beep sound indicating the start of time measurement from the speaker 150, reading of an elapsed time or remaining time, and outputting of a beep sound in a cycle or scale corresponding to the elapsed time or remaining time. Examples of notification with light include illuminating of a light-emitting diode (LED) indicating that time measurement has started, lighting displaying of an elapsed time and remaining time, and lighting/blinking of an LED with a cycle, color, and brightness according to the elapsed time or remaining time.

For displaying information on a display device, for example, an elapsed time or remaining time is displayed on an LCD monitor 154 of the spherical-image capturing apparatus 110 or an application screen of an external information terminal connected therewith via a universal serial bus (USB), Wifi (registered trademark), Bluetooth (registered trademark), or other types of wired or wireless connection protocol. However, the mode of guidance by the notification unit 212 is not particularly limited.

Figure 6:
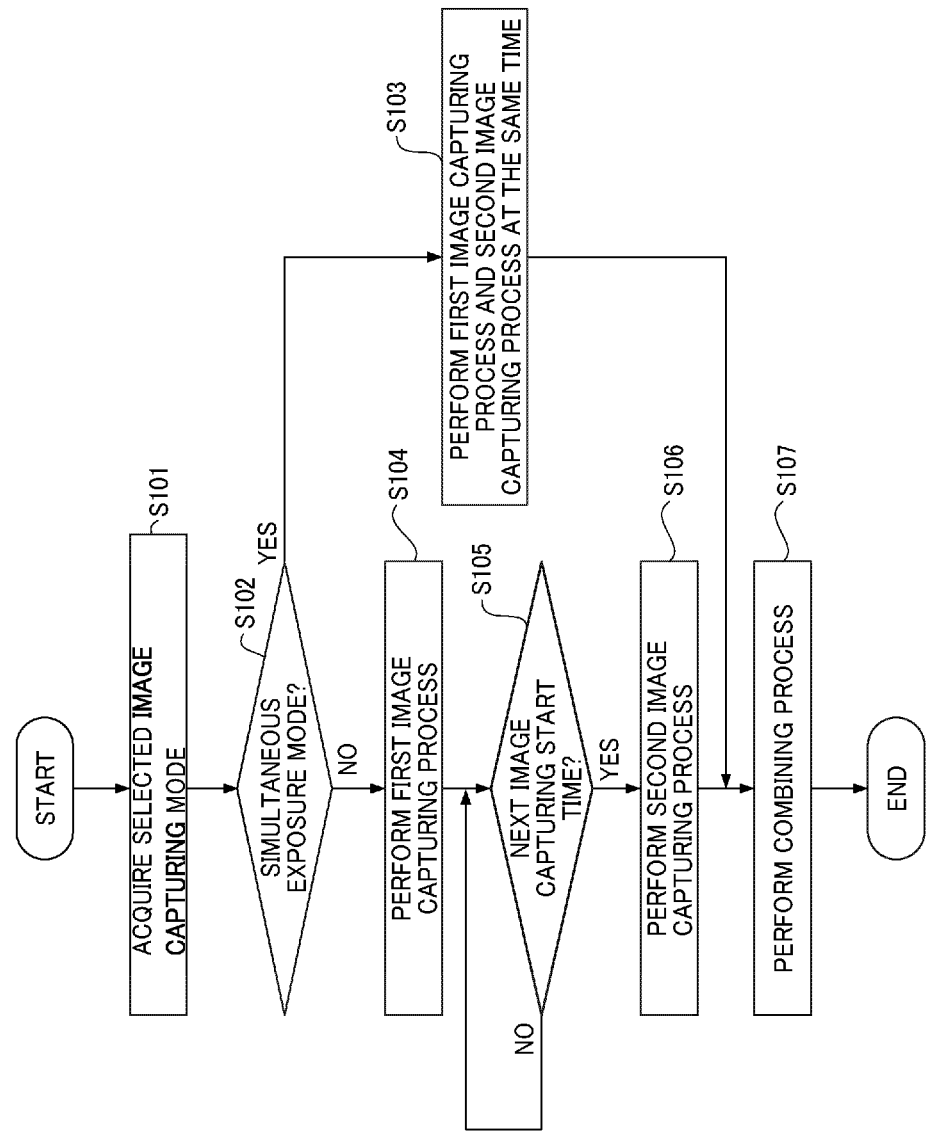
FIG. 6 is a flowchart of a process of capturing a spherical image performed by the spherical-image capturing apparatus according to an embodiment.

Hereinafter, the process of capturing a spherical image according to an embodiment is described in detail with reference to FIG. 6. FIG. 6 is a flowchart of a process of capturing a spherical image performed by the spherical-image capturing apparatus 110 according to an embodiment. The process in FIG. 6 is executed by the control unit 210.

The process under the control of the control unit 210 in FIG. 6 starts in response to an image-capturing instruction from a photographer. In step S101, the control unit 210 acquires a currently selected image-capturing mode. No limitation is intended, but the image-capturing mode according to at least one embodiment is selected from two options: the "simultaneous exposure mode" and the "staggered exposure mode" at which a plurality of image capturing units captures images at different timings. Note that any other types of modes may be included.

In step S102, the control unit 210 determines whether the currently selected image-capturing mode is the simultaneous exposure mode. When it is determined that the currently selected image-capturing mode is the simultaneous exposure mode in step S102 (YES in step S102), the process proceeds to step S103.

In step S103, the control unit 210 controls the image capturing unit 220 and the image signal processing unit 222 to execute the first image capturing process and the image capturing unit 230 and the image signal processing unit 232 to execute the second image capturing process at the same time. The process proceeds to step S107. The first image-capturing process ranges from a start of exposure of the image sensor 130 of the first image capturing unit 220 to an output of a fish-eye image in the YUV format from the first image signal processing unit 222, which are illustrated in FIG. 3. The second image-capturing process ranges from a start of exposure of the image sensor 130 of the second image capturing unit 230 to an output of a fish-eye image in the YUV format from the second image signal processing unit 232, which are illustrated in FIG. 3.

When it is determined that the currently selected image-capturing mode is not the simultaneous exposure mode in step S102 (NO in step S102), the process proceeds to step S104.

In step S104, the control unit 210 first controls the first image capturing unit 220 and the first image signal processing unit 222 to perform the first image-capturing process so as to capture an eye-fish image A, and then start measuring an elapsed time. In step S105, the control unit 210 determines whether it is time to start performing the next image capturing process. When a negative determination is made in step S105 (NO in step S105), the step S105 is repeated until the next image-capturing starting time (during the negative determination). When a positive determination is made (it is determined that it is time to start the next image-capturing process) in step S105 (YES in step S105), the process proceeds to step S106. In step S106, the control unit 210 controls the second image capturing unit 230 and the second image signal processing unit 232 to perform the second image-capturing process so as to capture a fish-eye image B captured at a different time (timing) from the fish-eye image A captured in step S104.

For example, when the timing for starting the measurement of the elapsed time is at the end of the first image-capturing process and the specified time is 10 seconds (sec), the second image capturing process starts 10 sec after the first image-capturing process ends. Alternatively, as described above, the timing for starting measurement of the specified time period may be set at the start of the first image capturing process or may be at the completion of output of the YUV image after the first image capturing process. Further, the specified time period may be set to any desired time by a user selection or input.

The photographer P (a specific subject), who does not desire to appear in a spherical image captured, moves outside the image-capturing range of the second image capturing process in subsequent to the first image capturing process within the specified time period. Alternatively, a subject that is not desired to be reflected in the spherical image is moved outside the image-capturing range of the second image capturing process in subsequent to the first image capturing process within the specified time period.

Figure 7A:
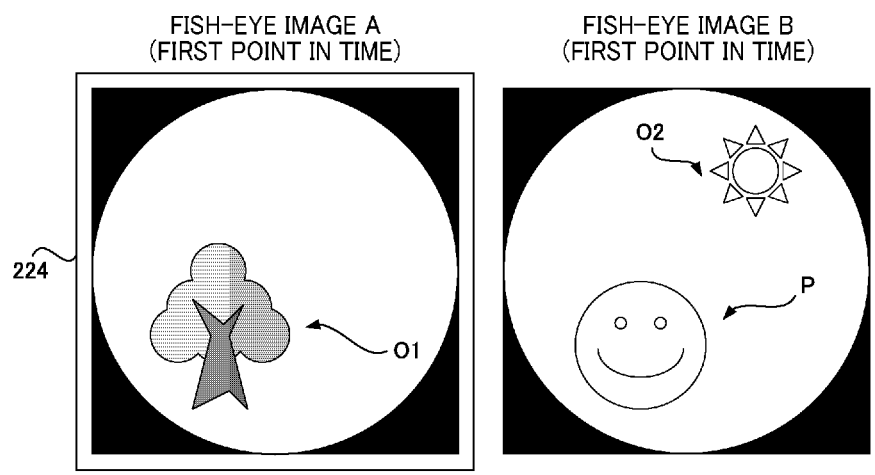
FIG. 7A is an illustration of fish-eye images captured by a first image-capturing process at a staggered exposure mode.
Figure 7B:
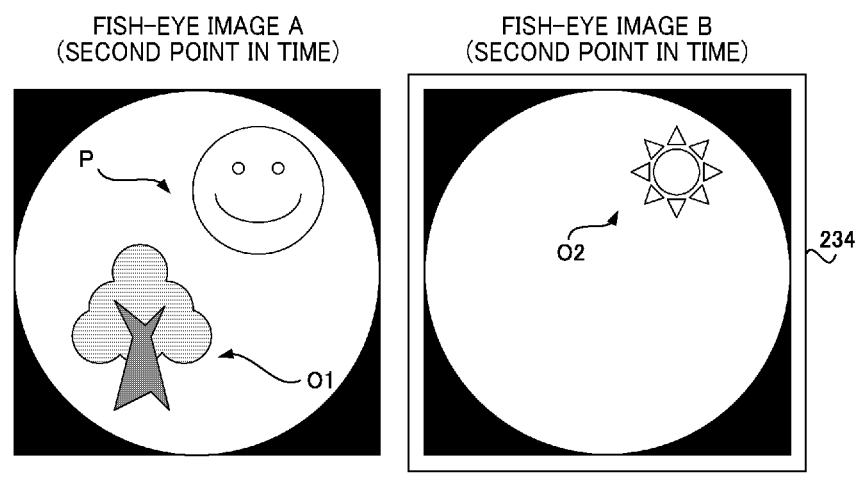
FIG. 7B is an illustration of fish-eye images captured by a second image-capturing process at the staggered exposure mode.

FIG. 7A is an illustration of two fish-eye images captured by the first image capturing process at the staggered exposure mode according to an embodiment. FIG. 7B is an illustration of two fish-eye images captured by the second image capturing process at the staggered exposure mode according to an embodiment.

When the first image capturing process is performed on the front side (the image-forming optical system 20A side) illustrated in FIG. 5A, the photographer P who does not desire to be reflected in the captured spherical image has to be on the second image capturing process side (the rear side, the fish-eye image B side) at the first point in time at which the first image capturing process is performed, as illustrated in FIG. 7A. Then, within a specified time period until the second point time at which the second image capturing process is performed after the first image capturing process, the photographer P needs to move to the first image capturing process side (the front side, the fish-eye image A side) as illustrated in FIG. 7B. The fish-eye images in FIGS. 7A and 7B are captured by the image capturing units on the both sides (both the first image capturing process side and the second image capturing process side) at the same time. However, the fish-eye image may not be captured on the second image capturing side opposite to the first image capturing process side.

In the embodiment to be described, as described above, the first image capturing process is the front side and the second image capturing process is the rear side. The positions of the first image capturing process and the second image capturing process may be reversed. In other words, when the photographer P is on the front side at first, the first image capturing process may be performed on the rear side, and the second image capturing process may be performed on the front side after the photographer P has moved to the rear side.

Further, as long as a negative determination is made in step S105 illustrated in FIG. 6, the notification unit 212 provides information to a user by making from the speaker 150 a sound for indicating the start of the time measurement at the time of starting the measurement of time, outputting from the speaker 150 a sound according to the elapsed time or remaining time, lighting/blinking the LED of the spherical-image capturing apparatus 110, or displaying the elapsed time or remaining time on the LCD monitor 154. Such a configuration enables a photographer to easily figure out the time available for the photographer to move.

In step S107, the control unit 210 controls the distortion correction/image combining unit 240 to combine the fish-eye image A (the first point in time) and the fish-eye image B (the second point in time) captured by the first image capturing process and the second image capturing process, so as to generate a combined image. Then, the process of capturing a spherical image ends.

Figure 7C:
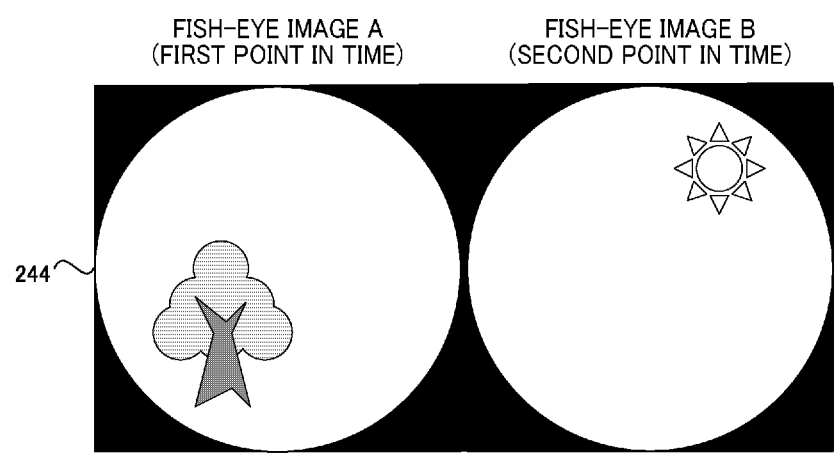
FIG. 7C is an illustration of a combined image.

Through the processes in step S104 to step S106, the first image capturing process and the second image capturing process are performed so as to obtain a plurality of fish-eye images 224 and 234 in the YUV format. In step S107, the distortion correction/image combining unit 240 performs distortion correction on and combines the two fish-eye images 224 and 234 in the YUV format so as to generate a spherical image 242 or a joined image 244. Note that whether to generate a spherical image 242 in the YUV format or a joined image 244 in the YUV format may be determined as desired. FIG. 7C is an illustration of a joined image 244 formed by combining the fish-eye images 224 and 234 captured at different timings as illustrated in FIGS. 7A and 7B. As illustrated in FIG. 7C, it is understood that the photographer P is not reflected as a subject in the joined image 244.

In the above-described embodiment, based on an elapsed time that has elapsed after an image is captured by one of the image capturing units 220 and 230 (the first image capturing process), another image is captured by the other image capturing unit 220 or 230 (the second image capturing process). In another embodiment, in response to acceptance of an explicit instruction to start a next image capturing process in subsequent to a first image capturing process performed by one of the image capturing units 220 and 230, the other image capturing unit 220 or 230 starts capturing an image. Such another embodiment is also illustrated in FIG. 3. The functional block of the spherical-image capturing apparatus 110 further includes an instruction receiving unit 214 indicated by a broken line.

The instruction receiving unit 214 waits for an explicit instruction from the photographer P, in response to which the second image capturing process is performed by one (for example, the image capturing unit 230) of the image capturing units after the first image capturing process performed by the other image capturing unit (for example, the image capturing unit 220). Such an explicit instruction may be made via a remote controller communicably connected (wire or wireless connection) with the spherical-image capturing apparatus 110 using Wifi (registered trademark) or Bluetooth (registered trademark). The remote controller may be a dedicated remote controller or may be installed as a control application in a general-purpose terminal such as a smartphone. When the spherical-image capturing apparatus 110 is connected to a general-purpose terminal, preview images captured by the first image capturing process and the second image capturing process may be actually displayed to the photographer P. In such a configuration, for example, the photographer P can explicitly make an instruction to start a next image capturing process when he/she has moved to a position that prevents himself/herself from being reflected in an image to be captured while looking a preview image.

In this embodiment, the control unit 210 controls the other image capturing unit (for example, the image capturing unit 230) to perform the next image capturing process (the second image capturing process) in response to acceptance of an explicit instruction, instead of performing such a control according to the above-described elapsed time. Further, whether the control unit 210 performs the control according to the elapsed time or in response to an explicit instruction from the photographer is selectable by a user. In addition, such an instruction may be an instruction indicating that the other image capturing unit (e.g., the image capturing unit 230) is available for the second image capturing process (for example, the photographer P presses the button when the image capturing unit to be used for the second image capturing process is ready). Alternatively, the instruction may indicate that the other image capturing unit (e.g., the image capturing unit 230) is not available for the second image capturing process (for example, the photographer P keeps pressing the button during preparation for the second image capturing process, and releases the button when the second image capturing process is ready).

Figure 8:
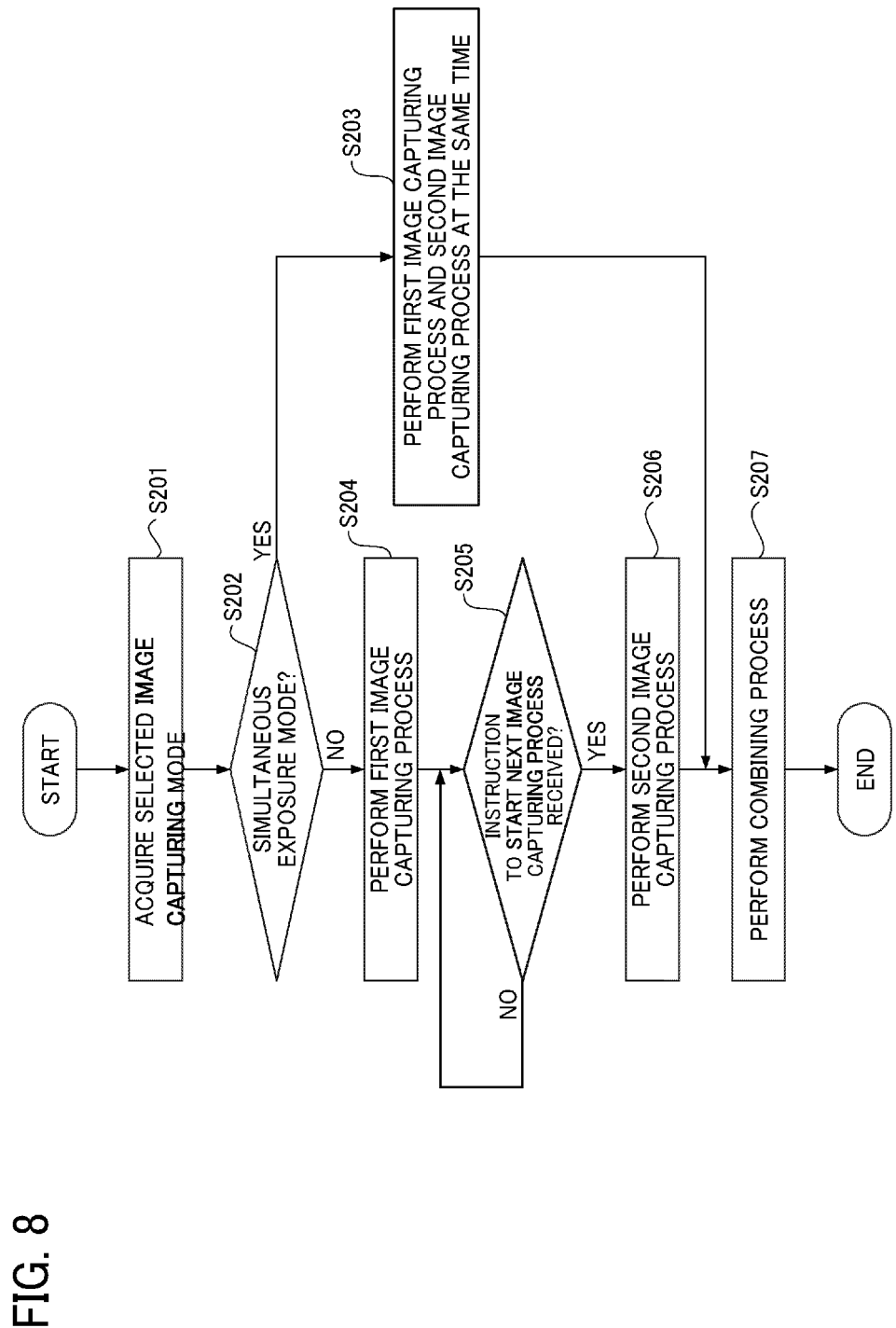
FIG. 8 is a flowchart of a process of capturing a spherical image performed by the spherical-image capturing apparatus according to another embodiment.

Hereinafter, the process of capturing a spherical image according to another embodiment is described with reference to FIG. 8. FIG. 8 is a flowchart of the process of capturing a spherical image performed by the spherical-image capturing apparatus 110 according to another embodiment. The process in FIG. 8 is performed by the control unit 210 including the CPU 112 same as in the embodiment of FIG. 6.

The process under the control of the control unit 210 in FIG. 8 starts in response to an image-capturing instruction from a photographer P. The processes in steps S201 to S203 are the same as the processes in steps S101 to S103 in FIG. 6.

When it is determined that the currently selected image-capturing mode is not the simultaneous exposure mode in step S202 (NO in step S202), the process proceeds to step S204. In step S204, the control unit 210 first controls the first image capturing unit 220 and the first image signal processing unit 222 to perform the first image capturing process, and waits for an instruction to start a next image capturing process in step S205.

The photographer P (a specific subject), who does not desire to appear in a spherical image captured, moves outside the image-capturing range of the second image capturing process in subsequent to the first image capturing process before making an instruction to start a next image capturing process. If it is determined that the control unit 210 has received the instruction to start a next image capturing process in step S205 (YES in step S205), the process proceeds to step S206. In step S206, the control unit 210 controls the second image capturing unit 230 and the second image signal processing unit 232 to perform the second image capturing process.

In step S207, the control unit 210 controls the distortion correction/image combining unit 240 to combine the fish-eye images captured by the first image capturing process and the second image capturing process, so as to generate a combined image. Then, the process of capturing a spherical image ends.

In the above-described embodiments, cases where two image capturing units 220 and 230 perform exposure and acquire data at different timings (in a staggered manner) to capture two fish-eye images, respectively are described.

Alternatively, the image capturing units 220 and 230 sequentially perform exposure and acquire data in a synchronous manner until the distortion correction/image combining unit 240 starts the distortion correction and image combining processes. Among the captured images, two fish-eye images captured at different times are selected to be combined by the distortion correction/image combining unit 240. In this case, the other images other than the selected ones are discarded.

That is, capturing images at different times (timings) means that the two image capturing units 220 and 230 perform exposure and acquire data at different timings instead of in a synchronous manner. Further, capturing images at different timings also means that the two image capturing units 220 and 230 sequentially perform a combination of exposure and acquisition of data in a continuous manner. Among the captured images, two fish-eye images on which the exposure and data acquisition have been performed at the different timings are selected.

Hereinafter, still another embodiment in which the spherical-image capturing apparatus 110 itself determines when to start a next image capturing process in subsequent to the first image capturing process, with reference to FIGS. 3, 9 to 11A, 11B, and 11C.

The embodiment in which the spherical-image capturing apparatus 110 itself determines the timing for starting the next image capturing process (the second image capturing process) is also illustrated in FIG. 3. In this embodiment, as illustrated in FIG. 3, the control unit 210 of the spherical-image capturing apparatus 110 is further configured to include a subject detection unit 216 indicated by a one-dot chain line.

In a specific embodiment, the subject detection unit 216 sequentially captures (performs exposure and acquires data) an image with the second image capturing unit (for example, the image capturing unit 230) of the image capturing units in the second image capturing process after capturing an image with the first image capturing unit (for example, the image capturing unit 220) in the first image capturing process. Subsequently, the subject detection unit 216 is configured to detect the disappearance of a certain subject within the captured image (the subject detection unit 216 determines whether a disappearance of a certain subject within the captured image is detected). The subject detection unit 216 constitutes a disappearance detection unit in a specific embodiment.

In response to a determination that the disappearance of a certain subject is detected from the image captured by the second image capturing unit (for example, the image capturing unit 230), the control unit 210 controls the second image capturing unit (for example, the image capturing unit 230) to end the second image capturing process. In this embodiment, the second image capturing unit (for example, the image capturing unit 230) may perform the second image capturing process after the disappearance of a certain subject has been detected. Alternatively, the image from which the disappearance of a certain subject has been detected may be selected to be combined.

Whether a certain subject has disappeared from a captured image is determined based on, for example, the detection results of a face detection block 144 on the fish-eye images. For example, it may be determined that a certain subject has disappeared when the number of faces within a fish-eye image captured at the detection target side decreases.

Alternatively, a face to be detected (a detection target) is registered in advance, and it can be determined that a certain subject has been disappeared when this detection target has been disappeared. Alternatively, without using such a face recognition technology, based on the tendency of luminance that increases with a disappearance of a subject, it can be determined that a certain subject has been disappeared when there is a change by a constant value or more in an average luminance of the entire area of the image capturing range of the image capturing process that is being performed.

In another specific embodiment, the subject detection unit 216 controls one image capturing unit (for example, the image capturing unit 220) to continuously capture an image (perform exposure and acquire data). The subject detection unit 216 is configured to detect the appearance of a certain subject in the captured images based on the images acquired by the one image capturing unit (for example, the image capturing unit 220).

The subject detection unit 216 constitutes an appearance detection unit in another specific embodiment. For example, a face of the photographer P is registered as a certain subject in advance, and in response to a detection of the appearance of the certain subject in the image captured by one image capturing unit (for example, the image capturing unit 220), the control unit 210 controls the other image capturing unit (for example, the image capturing unit 230) to capture an image.

FIG. 9 is a flowchart of a process of capturing a spherical image performed by the spherical-image capturing apparatus 110 according to still another embodiment. The process in FIG. 9 is performed by the control unit 210 including the CPU 112. The flowchart of the process in FIG. 9 is common between the case in which the disappearance of a certain subject is detected and the case in which the appearance of the certain subject is detected.

The process under the control of the control unit 210 in FIG. 9 starts in response to an instruction to start capturing an image, from a photographer P. The processes in steps S301 to S303 are the same as the processes in steps S101 to S103 in FIG. 6.

When it is determined that the currently selected image-capturing mode is not the simultaneous exposure mode in step S302 (NO in step S302), the process proceeds to step S304.

In step S304, the control unit 210 controls the first image capturing unit 220 and the first image signal processing unit 222 to perform the first image capturing process.

In step S305, the control unit 210 performs a process for detecting disappearance or appearance of a subject. In step S306, the control unit 210 determines whether disappearance or appearance of a certain subject has been detected.

When the control unit 210 determines that the disappearance or appearance of the certain subject has not been detected in step S306 (NO in step S306), the process returns to step S305 to repeat the process of detecting the disappearance or appearance of the subject in step S305.

When the control unit 210 determines that the disappearance or appearance of the certain subject has been detected in step S306 (YES in step S306), the process proceeds to step S307. In step S307, the control unit 210 controls the second image capturing unit 230 and the second image signal processing unit 232 to perform the second image capturing process.

Figure 10A:
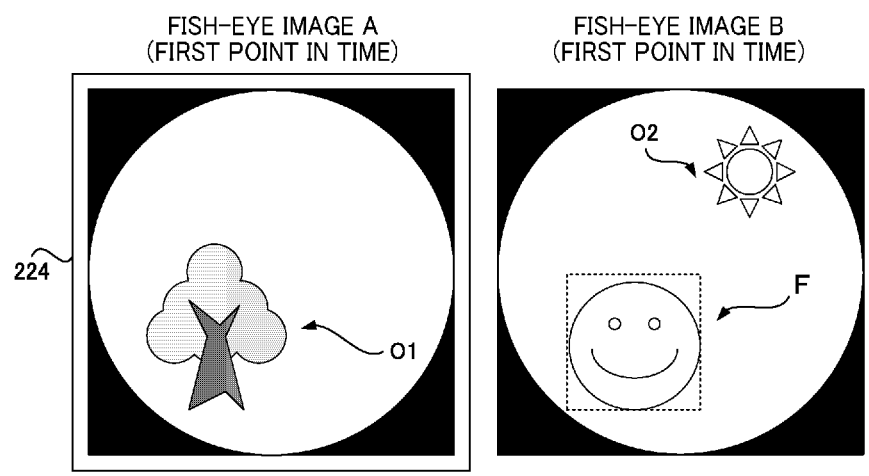
FIGS. 10 A, 10B, and 10C (FIG. 10) are illustrations of fish-eye images captured at different points in time by the spherical-image capturing apparatus according to an embodiment in which disappearance of a certain subject is detected.
Figure 10C:
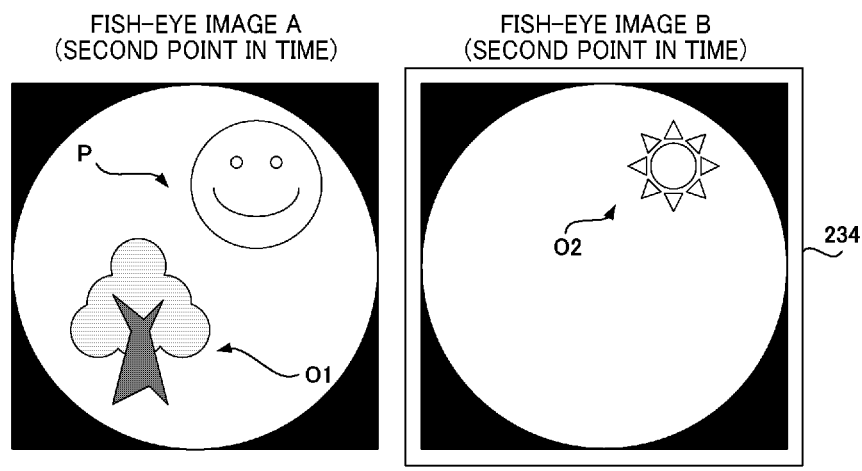

FIGS. 10A, 10B, and 10C are illustrations of fish-eye images captured at respective points in time in the process of detecting the disappearance of a certain subject according to a specific embodiment.

As illustrated in FIG. 10A, the photographer P is at the second image capturing process side (the rear side, the fish-eye image B side) at the first point in time when the first image capturing process is performed on the front side. The face F of the photographer P is detected from the fish-eye image B by the subject detection unit 216. As illustrated in FIG. 10B, the disappearance L of the face of the photographer P detected in the fish-eye image B is detected by the subject detection unit 216 at a certain point in time after the first image capturing process has been performed on the front side. In response to such a detection of the disappearance, the second image capturing process is performed on the rear side at the second point in time as illustrated in FIG. 10C. In this case, the photographer P is, for example, at the first image capturing process side (front side, fish-eye image A side) at which an image capturing process is not performed.

Figure 11A:
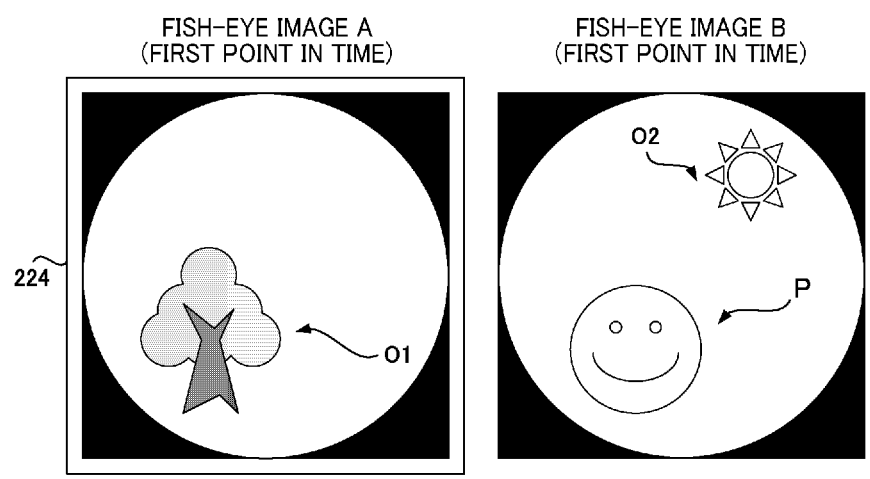
Figure 11B:
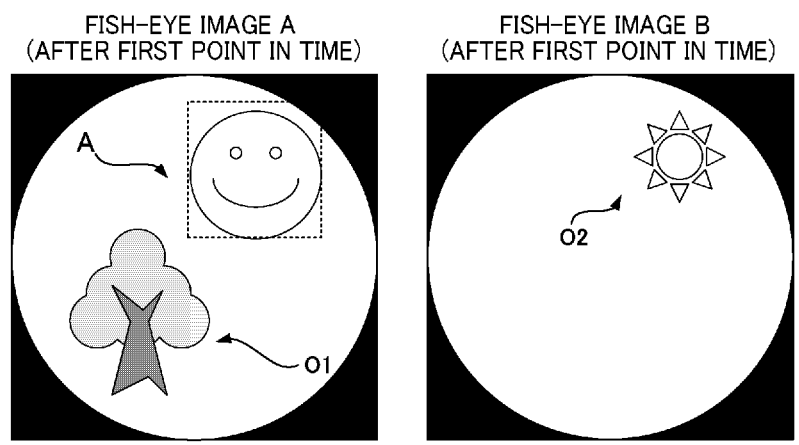

FIGS. 11A, 11B, and 11C are illustrations of fish-eye images captured at different points in time by the spherical-image capturing apparatus 110 according to an embodiment in which the appearance of a certain subject is detected.

As illustrated in FIG. 11A, the photographer P is at the second image capturing process side (the rear side, the fish-eye image B side) at the first point in time when the first image capturing process is performed on the front side.

The face of the photographer P is not detected from the fish-eye image A. As illustrated in FIG. 11B, the appearance of the face of the photographer P is detected from the fish-eye image A by the subject detection unit 216 at a certain point in time after the first image capturing process has been performed on the front side.

In response to such a detection of the appearance, the second image capturing process is performed on the rear side at the second point in time as illustrated in FIG. 11C. In this case, although the photographer P is at the first image capturing process side (front side, fish-eye image A side) at which an image is not captured, the face of the photographer P is detected from the fish-eye image A.

Referring back to FIG. 9 again, after step S307 and step S303, the process proceeds to step S308. In step S308, the control unit 210 controls the distortion correction/image combining unit 240 to combine the plurality of fish-eye images captured by the first image capturing process and the second image capturing process to generate a combined image. Then, the process in FIG. 9 ends.

The above-described embodiments of the present disclosure provide an image-capturing apparatus that includes a plurality of imaging devices (corresponding functions are first and second image capturing units) used to capture an image, capable of preventing a certain subject from being reflected in images captured by the plurality of imaging devices, an image capturing method, and a storage medium.

In an embodiment in which a subsequent image capturing process is performed based on the elapsed time after the first performed image capturing process, the photographer is able to easily move outside the image capturing range during the elapsed time, based on the elapsed time as an easy-to-understand index. At this time, if information is provided with a notification sound or notification light, or by displaying the information on a display device, the photographer can easily figure out a time period available for the photographer to move.

Further, in certain embodiments in which a subsequent image capturing process is performed in response to acceptance of an instruction, the photographer can obtain a sufficient length of time to move outside the image capturing range of the subsequent image capturing process and does not have to worry about time.

Further, in a specific embodiment in which the disappearance or appearance of a certain subject is detected in the captured image based on the captured image, the spherical-image capturing apparatus starts capturing an image based on its own determination. Accordingly, there is no need for the photographer to care about the elapsed time or make an explicit instruction for the subsequent image capturing process.

The functional units as described above is realized by a computer-executable program written by legacy programming language or object-oriented programming language such as assembler language, C language, C++ language, C# language, and Java (registered trademark), and the program can be distributed via telecommunication line or upon being written on a computer-computer-readable recording medium such as ROM, electrically erasable and programmable read only memory (EEPROM), erasable programmable read only memory (EPROM), flash memory, flexible disk, compact disc read only memory (CD-ROM), compact disc rewritable (CD-RW), digital versatile disk (DVD)-ROM, DVD-RAM, DVD-RW, Blu-ray disc, secure digital (SD) card, and magneto-optical disc (MO). All or some of the functional units described above can be implemented, for example, on a programmable device such as a field programmable gate array (FPGA), or as an application specific integrated circuit (ASIC). To implement such functional units on the programmable device, circuit configuration data (bit stream data) to be downloaded to the programmable device can be distributed using a recording medium that stores data written in, for example, a hardware description language (HDL), Very High Speed Integrated Circuit Hardware Description Language (VHDL), or Verilog HDL.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The processing apparatuses can include any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Numerous additional modifications and variations are possible in light of the above teachings. It is therefore to be understood that, within the scope of the appended claims, the disclosure of this patent specification may be practiced otherwise than as specifically described herein.

This patent application is based on and claims priority pursuant to 35 U.S.C. § 119(a) to Japanese Patent Application No. 2019-003576, filed on Jan. 11, 2019 and Japanese Patent Application No. 2019-231788, filed on Dec. 23, 2019, in the Japan Patent Office, the entire disclosure of which is hereby incorporated by reference herein.

REFERENCE SIGNS LIST

12 Imaging body,
14 Casing,
18 Shutter button,
20 Image-forming optical system,
22, 130 Image sensor,
110 Spherical camera,
112 CPU,
114 ROM,
116 Image processing block,
117: Still-image compression block,
118 Moving-image compression block,
119 Resize block,
120, 126 Interface,
122 Storage interface,
124 External sensor interface,
126 USB interface,
128 Serial block,
132 DRAM,
134 External memory,
136 Sensor,
138 USB connector,
144 Face detection block,
146 Sound processing unit,
148 Microphone,
150 Speaker,
152 LCD driver,
154 LCD monitor,
210 Control unit,
220 First image capturing unit,
222 First image signal processing unit,
230 Second image capturing unit,
232 Second image signal processing unit,
240 Distortion correction/image combining unit,
250 Codec processing unit

The invention claimed is:

1. An image capturing apparatus, comprising:
a plurality of imaging devices each of which including an optical system and an image sensor; and
processing circuitry configured to:
control the plurality of imaging devices to capture images, the plurality of imaging devices including a first imaging device and a second imaging device, and the images being captured at different timings;
combine the images captured by the plurality of imaging devices to generate a combined image;
determine, based on an image captured by the second imaging device and stored information corresponding to a subject, whether a disappearance of the subject from the image captured by the second imaging device is detected; and
in response to a determination that the disappearance of the subject has been detected, control the second imaging device to end capturing of another image.

2. The image capturing apparatus according to claim 1, wherein the processing circuitry is further configured to control the first image capturing device and the second image capturing device to capture images at the same time.

3. The image capturing apparatus according to claim wherein the processing circuitry is further configured to control the second imaging device to capture the image based on an elapsed time from a time at which the first imaging device has captured an image.

4. The image capturing apparatus according to claim 3, wherein the processing circuitry is further configured to provide information regarding an image capturing process of the second imaging device based on the elapsed time with a notification sound or notification light.

5. The image capturing apparatus according to claim 3, wherein the processing circuitry is further configured to provide information regarding an image capturing process of the second imaging device based on the elapsed time by displaying the information on a display device.

6. The image capturing apparatus according to claim 1, wherein the processing circuitry is further configured to:
control the first imaging device to capture a first image;
determine whether an instruction to start controlling the second imaging device to capture the image is accepted; and
in response to a determination that the instruction has been accepted, control the second imaging device to start capturing the image.

7. The image capturing apparatus according to claim 1, wherein the processing circuitry is further configured to:
control the first imaging device to capture a first image;
based on the first image captured by the first imaging device, determined whether an appearance of the subject is detected in the first image captured by the first imaging device; and
in response to the detection of the appearance of the subject, control the second imaging device to capture the image.

8. The image capturing apparatus according to claim 1, wherein
images captured by each of the plurality of imaging devices is a fish-eye image,
the combined image is one of:
a spherical image obtained by transforming coordinates of fish-eye images captured by the plurality of imaging devices and combining the fish-eye images; and
an image obtained by joining the captured fish-eye images together, and the image capturing apparatus is a spherical-image capturing apparatus.

9. An imaging method, comprising:
capturing images with a plurality of imaging devices, the plurality of imaging devices including a first imaging device and a second imaging device, and the images being captured at different timings;
combining the images captured by the plurality of imaging devices to generate a combined image;
determining, based on an image captured by the second imaging device and stored information corresponding to a subject, whether a disappearance of the subject from the image captured by the second imaging device is detected; and in response to a determination that the disappearance of the subject has been detected, controlling the second imaging device to end capturing of another image.

10. The imaging method according to claim 9, wherein the capturing the image with the second imaging device is further based on an elapsed time from capturing of a first image with the first imaging device, the capturing the image with the second imaging device is further in response to an acceptance of an instruction to start capturing the image with the second imaging, after the capturing the first image with the first imaging device, or the capturing the image with the second imaging device is further in response to a determination that an appearance of the subject is detected from the first image captured by the first imaging device.

11. A non-transitory recording medium storing computer executable instructions which, when executed by processing circuitry of an apparatus, cause the apparatus to perform a method comprising:

capturing images with a plurality of imaging devices, the plurality of imaging devices including a first imaging device and a second imaging device, and the images being captured at different timings;

combining the images captured by the plurality of imaging devices to generate a combined image;

determining, based on an image captured by the second imaging device and stored information corresponding to a subject, whether a disappearance of the subject from the image captured by the second imaging device is detected; and in response to a determination that the disappearance of the subject has been detected, controlling the second imaging device to end capturing of another image.

* * * * *